United States Patent [19]

Hirose et al.

[11] Patent Number: 5,537,307
[45] Date of Patent: Jul. 16, 1996

[54] CONTROL DEVICE FOR SYSTEM INTERCONNECTION INVERTER

[75] Inventors: Syunichi Hirose; Nobukazu Takashima, both of Tokyo; Susumu Tanaka, Chiba-ken; Tatsuro Yamaguchi, Kanagawa-ken; Hidetaka Sato, Ichihara; Minoru Abe, Tokyo; Masahito Ooyama, Yokohama, all of Japan

[73] Assignees: Kabushiki Kaisha Toshiba, Kawasaki; The Tokyo Electric Power Company, Incorporated, Tokyo, both of Japan

[21] Appl. No.: 458,017

[22] Filed: Jun. 1, 1995

Related U.S. Application Data

[63] Continuation of Ser. No. 180,279, Jan. 12, 1994, abandoned.

[30] Foreign Application Priority Data

Jan. 12, 1993 [JP] Japan .................................. 5-003315
Jul. 23, 1993 [JP] Japan .................................. 5-182654

[51] Int. Cl.$^6$ .................................................. H02M 7/48
[52] U.S. Cl. .............................. 363/79; 363/98; 363/132; 323/207
[58] Field of Search .......................... 323/207; 363/40, 363/75, 79, 95, 96, 98, 132

[56] References Cited

U.S. PATENT DOCUMENTS

| | | | |
|---|---|---|---|
| 5,047,959 | 8/1991 | Walker | 363/79 |
| 5,237,339 | 7/1993 | Kishimoto et al. | 363/37 |
| 5,250,890 | 10/1993 | Tanamachi et al. | 363/98 |
| 5,257,180 | 10/1993 | Sashida et al. | 363/77 |
| 5,272,630 | 5/1993 | Yamamoto et al. | 363/71 |
| 5,736,494 | 8/1992 | Akagi et al. | 363/34 |

FOREIGN PATENT DOCUMENTS

| | | |
|---|---|---|
| 0217298 | 4/1987 | European Pat. Off. . |
| 0310048 | 4/1989 | European Pat. Off. . |
| 0444666 | 9/1991 | European Pat. Off. . |
| 0467374 | 1/1992 | European Pat. Off. . |
| 0576271 | 12/1993 | European Pat. Off. . |
| 55-34851 | 3/1980 | Japan . |

OTHER PUBLICATIONS

S. Hirose, et al., PCIM Proceedings, Dec. 8, 1988, "Application of a Digital Instantaneous Current Control for Static Induction Thyristor Converters in the Utility Line." pp.343–351.

IEEE Transactions on Power Electronic 6(1991)Jul., No. 3, New York, US, "Parallel Processing Inverter System", Takao Kawabata et al, pp. 442–450.

*Primary Examiner*—Peter S. Wong
*Assistant Examiner*—Shawn Riley
*Attorney, Agent, or Firm*—Oblon, Spivak, McClelland, Maier & Neustadt

[57] ABSTRACT

A control device for a system interconnection inverter. The control device includes an active/reactive current reference generator and an active/reactive current detector for detecting an output AC current of the inverter. The control device further includes a phase detector, a frequency detector, and a voltage amplitude detector of the AC voltage of the inverter. The control device also includes a frequency reference generator and a voltage amplitude reference generator. The control device also includes a frequency correction computing circuit and a voltage amplitude correction computing circuit. The control device further includes an adder for adding the active current reference signal and the voltage amplitude correction signal to output as an active current correction reference signal, and for adding the reactive current reference signal and the frequency correction signal to output as a reactive current correction signal. The control device still further includes a current control circuit for generating an output voltage reference signal for the inverter and a gate control circuit for controlling the output voltage of the inverter based on the output voltage reference signal.

11 Claims, 12 Drawing Sheets

CONTROL DEVICE FOR SYSTEM INTERCONNECTION INVERTER

This application is a Continuation of application Ser. No. 08/180.279, filed on Jan. 12, 1994, now abandoned.

BACKGROUND OF THE INVENTION

1. Field of the Invention

This invention relates to a control device for an inverter which operates the supply and reception of power to and from an AC system by interconnecting with the AC system, and more particularly relates to a control device for a system interconnection inverter which can continuously supply power to a load by the inverter alone even if the interconnection with the AC system is interrupted.

2. Description of the Related Art

System interconnection inverters are used for supplying power to loads from DC power sources, such as fuel cells, secondary battery cells and rectifiers. They are also used for receiving and supplying power between these DC power sources and AC systems.

FIG. 14 is a diagram showing a prior art example of a control device for this type of system interconnection inverter. The prior art control device is composed of a voltage source type self-commutated inverter 10 and an inverter control device 100. Voltage source type self-commutated inverter 10 is composed of an inverter main circuit 1 (described later), a DC capacitor 2 and a transformer 3. Inverter main circuit 1 has power conversion devices (controllable switching devices) GU, GV, GW, GX, GY and GZ and rectifying devices DU, DV, DW, DX, DY and DZ. Power conversion devices having self-turn-off ability, such as GTOs (gate turn-off thyristors), power transistors, IGBTs (insulated gate bipolar transistors) and SI (static induction type) thyristors may be used as power conversion devices GU, GV, GW, GX, GY and GZ. Self-commutated inverter 10 is interconnected to a 3-phase AC system 6 via an interconnection circuit breaker 5 and is also connected to a load 7.

Inverter control device 100 is composed of an active/reactive current reference generator 101, a phase detector 103, an active/reactive current detector 104, a current control circuit 105, a gate control circuit 106 and also Hall CTs 201, 202 and 203.

Inverter main circuit 1 can control the 3-phase output voltage of inverter main circuit 1 by altering the conductive periods of power conversion devices GU, GV, GW, GX, GY and GZ. It also controls the current supplied to and received from AC system 6 via the impedance of transformer 3 by adjusting the phase and amplitude of the 3-phase output voltage of inverter main circuit 1 in response to the phase and amplitude of system voltages VR, VS and VT of AC system 6.

By means of this current control, inverter 10 supplies and receives active power to and from AG system 6 and also supplies reactive power to AC system 6 via interconnection circuit breaker 5 by converting the DC power of a DC power source 4 to active power or converting active power to DC power. Similarly, inverter 10 also supplies active power and reactive power to load 7.

Current control of inverter 10 is performed by inverter control device 100 as follows.

Phase detector 103 detects a phase $\theta$ of system voltages VR, VS and VT of 3-phase AC system 6 on the inverter 10 side.

Active/reactive current detector 104 detects the active current component and the reactive current component from inverter output AC currents iR, iS and iT which are detected by Hall CTs 201, 202 and 203, as respective active current detected value iq and reactive current detected value id.

Current control circuit 105 computes inverter output voltage references VRc, VSc and VTc, which determine the 3-phase output voltage of inverter main circuit 1, so that active current detected value iq and reactive current detected value id from active/reactive current detector 104 equals active current reference value iqc and reactive current reference value idc from active/reactive current reference generator 101. In the calculation of these inverter output voltage references VRc, VSc and VTc, the phase of the inverter output voltage for that of system voltages VR, VS and VT of AC system 6 are to be determined. Therefore, system voltage phase $\theta$ detected by phase detector 103 is used in the calculation.

Gate control circuit 106 compares inverter output voltage references VRc, VSc, and VTc with a triangular carrier wave signal produced within gate control circuit 106, and outputs gate signals which determine the conductive periods of power conversion devices GU, GV, GW, GX, GY and GZ composing inverter main circuit 1.

A detailed explanation of the operation of the system interconnection inverter and its control device shown in FIG. 14 have already been given in the reference A stated below. The detailed explanation is therefore omitted here.

Reference A: Shun-ichi Hirose et al. "Application of a digital instantaneous current control for static induction thyristor converters in the utility line". PCIM Proceedings, pp 343–349, Dec. 8, 1988 in Japan.

Also, the operation of gate control circuit 106 is given in the reference B stated below.

Reference B: Report of the Institute of Electrical Engineers of Japan, Specialist Committee on the Study of Semiconductor Power Conversion Methods, "Semiconductor power conversion circuits", pp 108–112, "PWM Inverter", published on Mar. 31, 1987 by the Institute of Electrical Engineers of Japan, Incorporated.

The prior art system interconnection inverter control device in FIG. 14 has the following problem. That is to say, when interconnection circuit breaker 5 opens due to the occurrence of a fault or the like in AC system 6, inverter 10 cannot execute the supply and reception of power with AC system 6 and, at the same time, the phase of the AC voltage of AC system 6 cannot be detected. Therefore, active current component iq and reactive current component id, which are detected from inverter output AC currents iR, iS and iT, cannot be outputted as active current reference value iqc and reactive current reference value idc from active/reactive current reference generator 101 as they should be. As a result, the output voltage and frequency of inverter 10 increase or decrease so that the desired power cannot be supplied to load 7. Therefore, the problem arises that the operation of inverter 10 has to be stopped.

SUMMARY OF THE INVENTION

Accordingly, one object of this invention is to provide a control device for a system interconnection inverter which can continue to supply to the load by the inverter alone while the inverter is executing the supply and reception of power with an AC system by interconnection with the AC system, even if interconnection with the AC system is interrupted.

Another object of this invention is to provide a control device for a system interconnection inverter which can increase the reliability of a system using a system interconnection inverter and can expand the range of its application, since, whether the interconnection state of the system interconnection inverter and the AC system changes from the interconnected state to the sole state or conversely from the sole state to the interconnected state, it can supply the appropriate power to the load from a system using a system interconnection inverter without taking this state alteration as a state signal for the interconnection circuit breaker or the like, or without temporarily interrupting the operation of the system interconnection inverter.

These and other objects of this invention can be achieved by providing a control device for an inverter. The inverter is connected to an AC system via an interconnection circuit breaker, is connected to a load, converts DC power from a DC power source to AC power, and supplies or receives the AC power to or from the AC system. The load receives the AC power. The control device includes active/reactive current reference generator for generating an active current reference signal and a reactive current reference signal and an active/reactive current detector for detecting an active current component and a reactive current component of an output AC current of the inverter to output as an active current signal and a reactive current signal, respectively. The control device further includes a phase detector for detecting a phase of the AC Voltage to output as a phase signal, a frequency detector for detecting a frequency of the AC voltage to output as a frequency signal and a voltage amplitude detector for detecting an amplitude of the AC voltage to output as a voltage amplitude signal. The control device also includes a frequency reference generator for generating a frequency reference signal and a voltage amplitude reference generator for generating a voltage amplitude reference signal. The control device also includes a frequency correction computing circuit for detecting a frequency deviation between the frequency reference signal and the frequency signal and for generating a frequency correction signal based on the frequency deviation, and a voltage amplitude correction computing circuit for detecting a voltage amplitude deviation between the voltage amplitude reference signal and the voltage amplitude signal and for generating a voltage amplitude correction signal based on the voltage amplitude deviation. The control device further includes an adder for adding the active current reference signal and the voltage amplitude correction signal to output as an active current correction reference signal, and for adding the reactive current reference signal and the frequency correction signal to output as a reactive current correction signal. The control device still further includes a current control circuit connected to receive the phase signal, the active current signal, the reactive current signal, the active current correction reference signal, and the reactive current correction reference signal for generating an output voltage reference signal for the inverter such that the active current signal equals the active current correction reference signal and the reactive current signal equals the reactive current correction reference signal, and a gate control circuit for controlling the output voltage of the inverter based on the output voltage reference signal.

According to one aspect of this invention, there is provided a control device for an inverter as described above. The control device is also constructed as described above. In addition, in the control device, the frequency correction computing circuit generates the frequency correction signal only when the frequency deviation exceeds a first specified value, and the voltage amplitude correction computing circuit generates the voltage amplitude correction signal only when the voltage amplitude deviation exceeds a second specified value.

According to another aspect of this invention, there is further provided a control device for an inverter as described above. The control device is also constructed as described above, and further includes a voltage/frequency monitoring circuit connected to receive the frequency signal and the voltage amplitude signal for generating a switching-OFF signal when the frequency signal is outside a first specified band or the voltage amplitude signal is outside a second specified band. The control device also includes a computing circuit saturation detector connected to receive the frequency correction signal and the voltage amplitude correction signal for generating a switching-OFF cancellation signal only when a state where the frequency correction signal exceeds a first maximum output level has continued for more than a specified period or a state where the voltage correction signal exceeds a second maximum output level has continued for more than the specified period. In addition, in the control device, the frequency correction computing circuit generates the frequency correction signal only when the switching-OFF signal is applied and the switching-OFF cancellation signal is not applied, and the voltage amplitude correction computing circuit generates the voltage amplitude correction signal only when the switching-OFF signal is applied and the switching-OFF cancellation signal is not applied.

According to this invention, it is possible to continue to supply power to the load by the inverter alone, even if interconnection with the AC system is interrupted, by causing the current control circuit to output an inverter output voltage reference signal by controlling such that the active current signal becomes equal to the active current correction reference signal and, at the same time, the reactive current signal becomes equal to the reactive current correction reference signal.

In addition, according to one aspect of this invention, a deadband-fitted frequency correction computing circuit and a deadband-fitted voltage amplitude correction computing circuit are provided in the control device for the inverter. Therefore, unnecessary control operations which occur due to system fluctuation during system interconnected operation can be suppressed.

Furthermore, according to another aspect of this invention, a voltage/frequency monitoring circuit regards times when the fluctuations of the voltage amplitude and the frequency exceed the specified bands as transferring to sole operation. Also, by operating the switch-fitted voltage amplitude correction computing circuit and the switch-fitted frequency correction computing circuit, the operation of commencing the correction control can be executed. Therefore, the operation of this correction control is suppressed during system fluctuations, and also control with excellent accuracy without deadbands can be executed when transferring to sole operation. Moreover, when transferring from sole operation to interconnected operation, the computing circuit saturation detector monitors the levels of the voltage correction signal and the frequency correction signal. Therefore, the operation of stopping correction control when the output continuously exceeds a specified level can be executed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
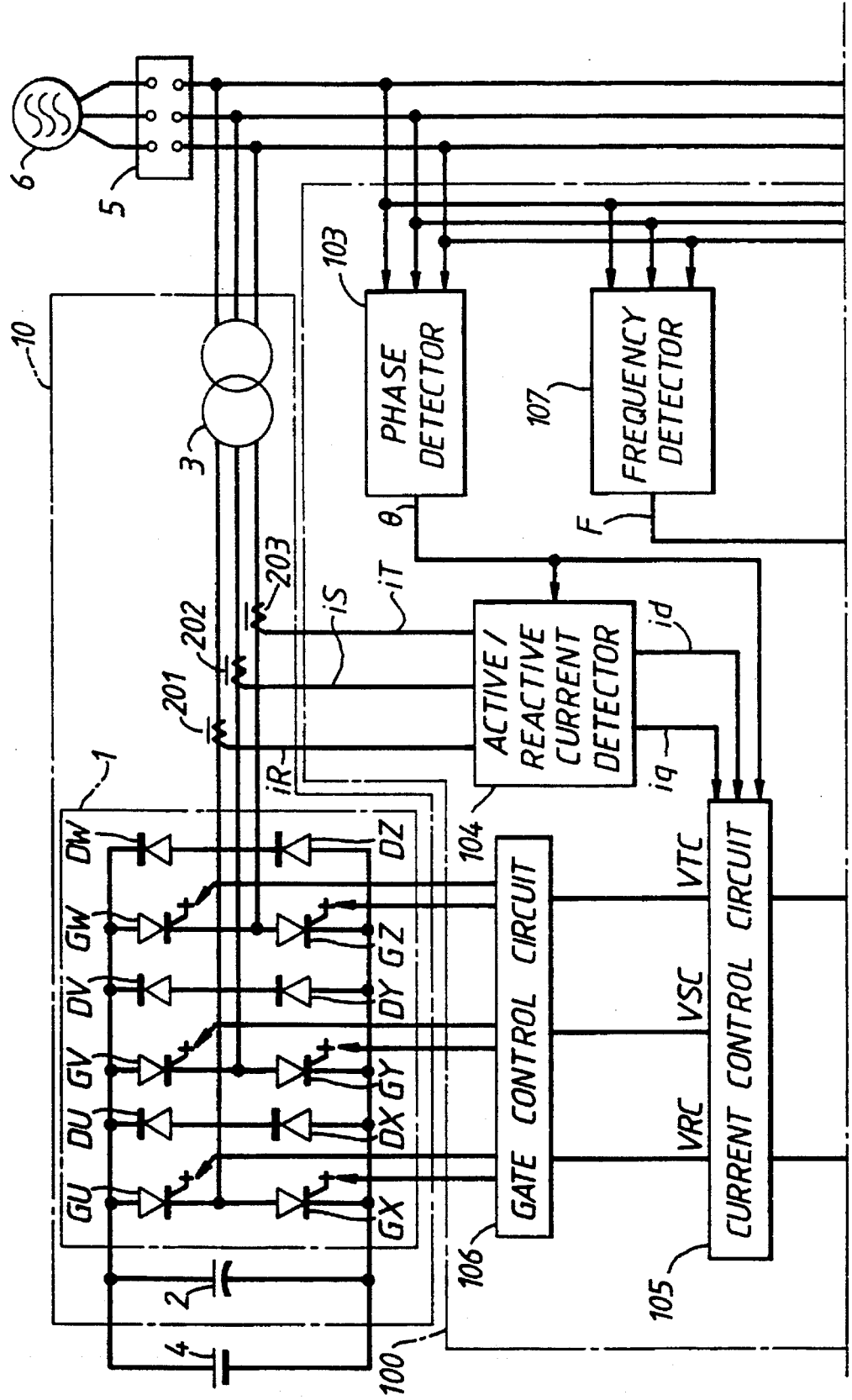
FIGS. 1a and 1b are block diagrams showing the composition of a first embodiment of a system interconnection inverter control device of this invention.

Referring now to the drawings, wherein like reference numerals designate identical or corresponding parts throughout the several views, the embodiments of this invention will be described below.

Figure 1B:
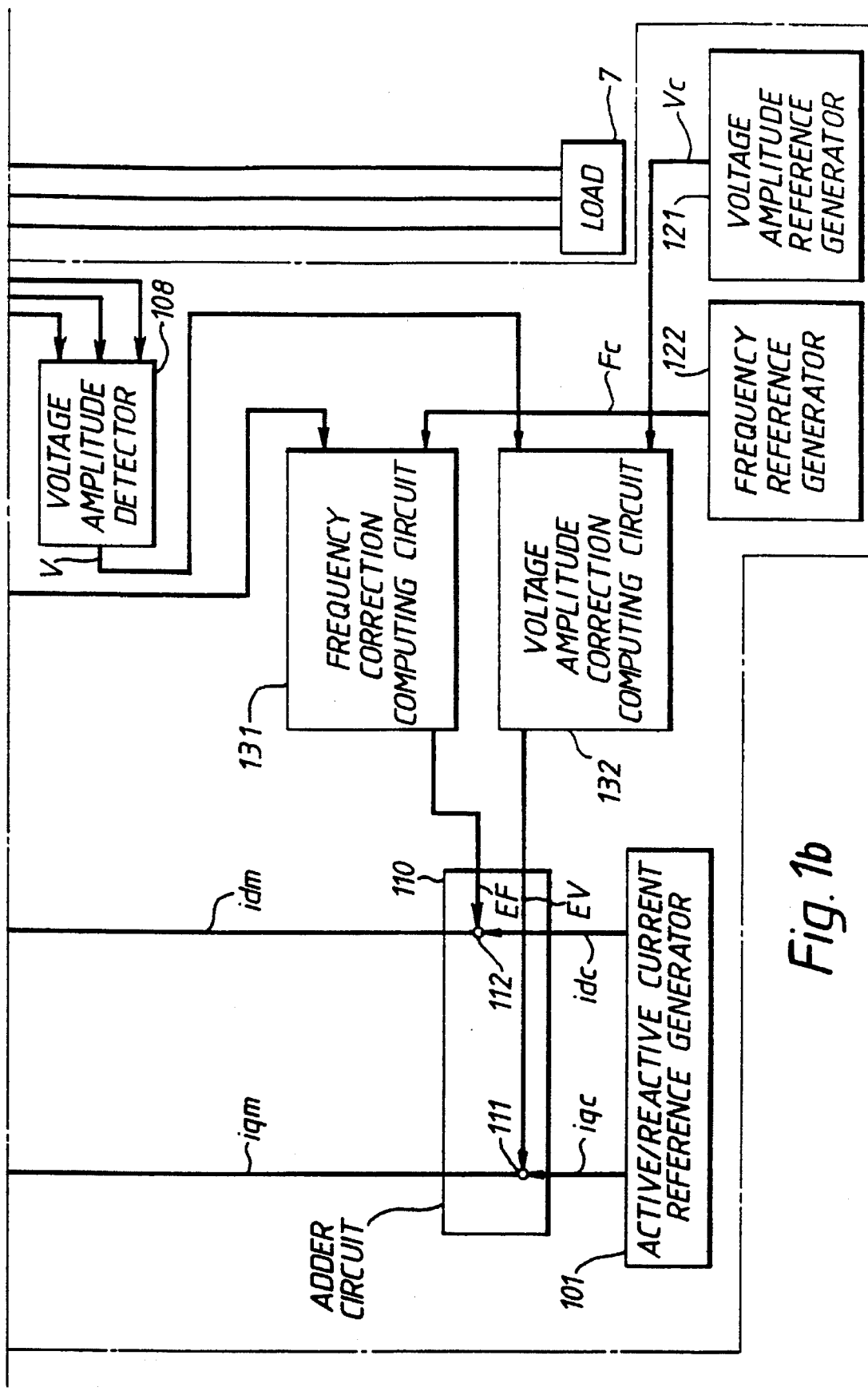

FIGS. 1a and 1b are showing the composition of a first embodiment of this invention. The following additional features differ from the prior art example of FIG. 14:

a frequency detector 107, which composes the frequency detector means;

a voltage amplitude detector 108, which composes the voltage detector means;

an adder circuit 110, which composes the adder means;

a voltage amplitude reference generator 121, which composes the voltage amplitude reference generator means;

a frequency reference generator 122, which composes the frequency reference generator means;

a frequency correction computing circuit 131, which composes the frequency correction computing circuit means;

and a voltage amplitude correction computing circuit 132, which composes the voltage amplitude correction computing circuit means.

Figure 14:
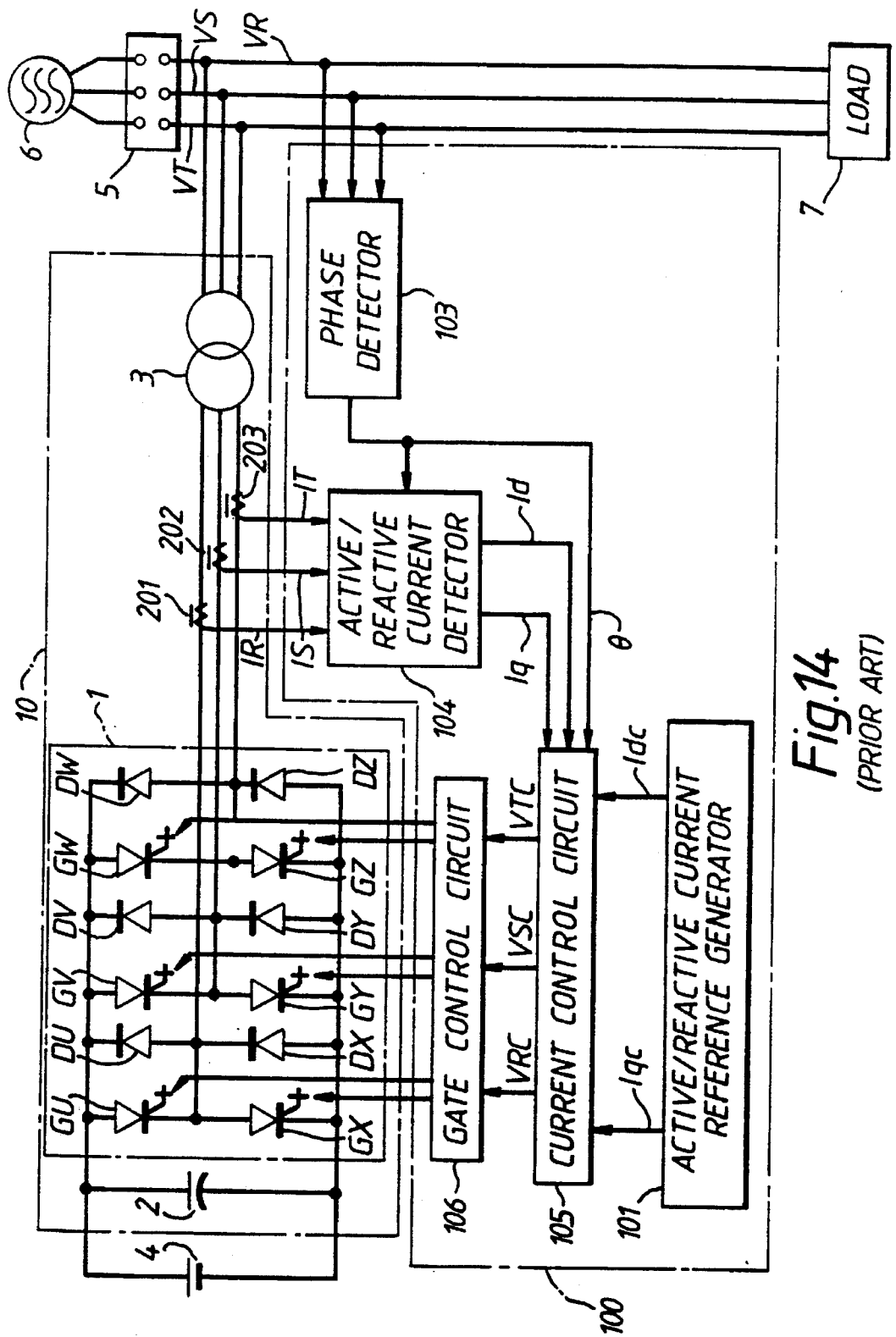
FIG. 14 is a diagram to illustrate the composition of an example of a prior art system interconnection inverter and its control device.

Points other than these are the same as in FIG. 14.

Frequency detector 107 detects the frequency of the AC voltage applied on load 7 from AC system 6 or inverter 10 and outputs a frequency signal F. Voltage amplitude detector 108 detects the amplitude of the AC voltage and outputs a voltage amplitude signal V. Frequency reference generator 122 outputs a frequency reference signal Fc. Voltage amplitude reference generator 121 outputs a voltage amplitude reference signal Vc. Frequency correction computing circuit 131 outputs a frequency correction signal EF from the deviation between frequency reference signal Fc and frequency signal F, as described later. Voltage amplitude correction computing circuit 132 outputs a voltage amplitude correction signal EV from the deviation between voltage amplitude reference signal Vc and voltage amplitude signal V.

Adding circuit 110 has adders 111 and 112. Adder 111 subtracts voltage amplitude correction signal EV outputted from voltage amplitude correction computing circuit 132 from active current reference iqc outputted from active/reactive current reference generator 101, and outputs an active current correction reference signal iqm to current control circuit 105. Also, adder 112 subtracts frequency correction signal EF outputted from frequency correction computing circuit 131 from reactive current reference idc outputted from active/reactive current reference generator 101, and outputs a reactive current correction reference signal idm to current control circuit 105.

Figure 2:
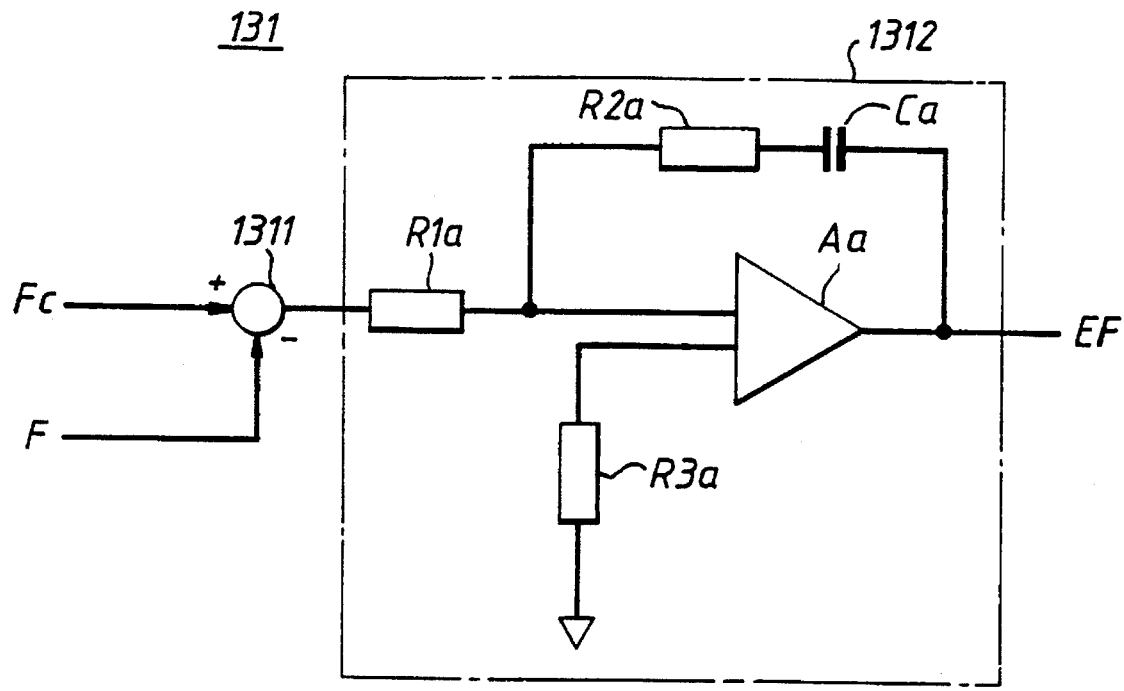
FIG. 2 is a diagram showing an example of a practical circuit for a frequency correction computing circuit 131 in FIGS. 1a and 1b.

FIG. 2 shows a practical circuit example for frequency correction computing circuit 131 in FIG. 1. Circuit 131 is composed of an adder 1311 and a proportional integration computing circuit 1312. Proportional integration computing circuit 1312 is composed of an operational amplifier Aa, resistors R1a, R2a and R3a and a capacitor Ca.

Figure 3:
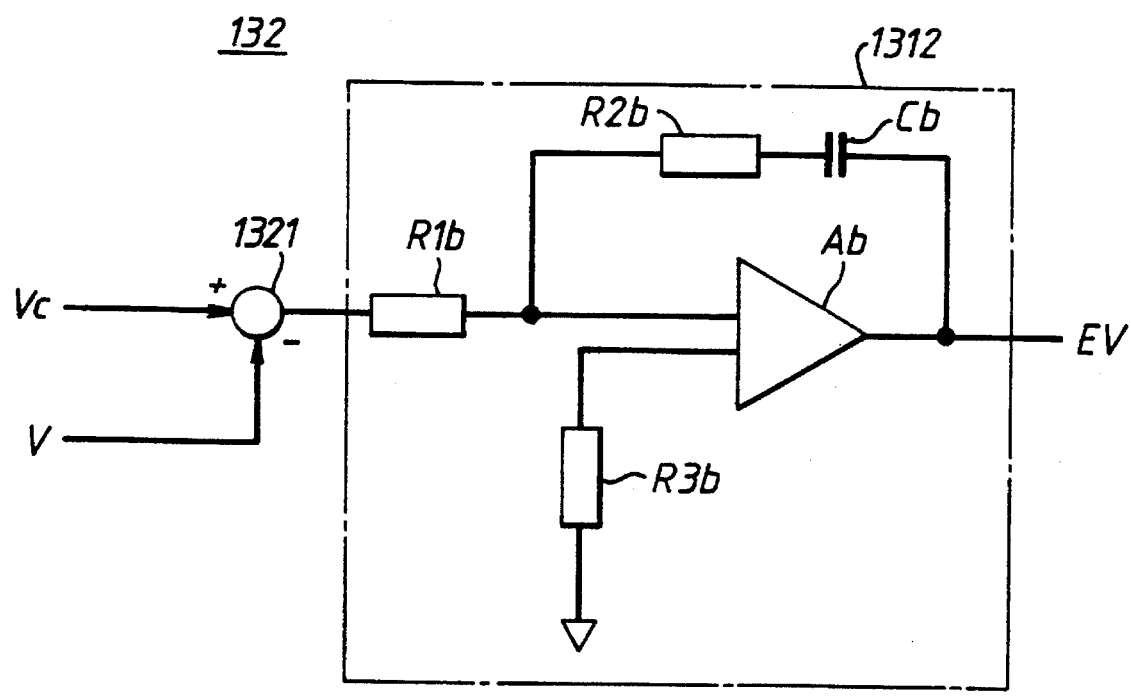
FIG. 3 is a diagram showing an example of a practical circuit for a voltage amplitude correction computing circuit 132 in FIGS. 1a and 1b.

FIG. 3 shows a practical circuit example for voltage amplitude correction computing circuit 132 in FIG. 1. Circuit 132 is composed of an adder 1321 and a proportional integration computing circuit 1322. Proportional integration computing circuit 1322 is composed of an operational amplifier Ab, resistors R1b, R2b and R3b and a capacitor Cb.

When using this type of composition, it is possible to continue to supply power to load 7 by inverter 10 alone, even if interconnection with AC system 6 is interrupted, by causing current control circuit 105 to output inverter output voltage reference signals VRc, VSc and VTc by controlling such that active current signal iq equals active current correction reference signal iqm and, at the same time, reactive current signal id equals reactive current correction reference signal idm.

The following is a description of the operation of this embodiment. In FIGS. 1a and 1b, frequency detector 107 detects the frequency of the AC voltage on the inverter 10 side of interconnection circuit breaker 5, and outputs frequency signal F. Voltage amplitude detector 108 detects the amplitude of the AC voltage on the inverter 10 side of interconnection circuit breaker 5 and outputs voltage amplitude signal V. Frequency reference generator 122 outputs frequency reference signal Fc which is equal to the rated frequency of the voltage of AC system 6. Voltage amplitude reference generator 121 outputs voltage amplitude reference signal Vc which is equal to the rated amplitude of the voltage of AC system 6.

Frequency correction computing circuit 131 inputs frequency reference signal Fc from frequency reference generator 122 and frequency signal F from frequency detector 107. After taking the difference by adder 1311, it outputs frequency correction signal EF via proportional integration computing circuit 1312.

Voltage amplitude correction computing circuit 132 inputs voltage reference signal Vc from voltage amplitude reference generator 121 and voltage amplitude signal V from voltage amplitude detector 108. After taking the difference by adder 1321, it outputs voltage amplitude correction signal EV via proportional integration computing circuit 1322.

In proportional integration computing circuits 1312 and 1322, the values of the resistors and capacitors and the gains of operational amplifiers Aa and Ab can be easily determined by those skilled in the art, so the detailed description thereof may be omitted.

Adding circuit 110 subtracts frequency correction signal EF outputted from frequency correction computing circuit 131 from reactive current reference idc outputted from active/reactive current reference generator 101 using adder 112, and outputs reactive current correction reference signal idm. At the same time, it subtracts voltage amplitude correction signal EV outputted from voltage amplitude correction computing circuit 132 from active current reference iqc outputted from active/reactive current reference generator 101 using adder 111, and outputs active current correction reference signal iqm.

Current control circuit 105 inputs reactive current reference signal idm outputted from adding circuit 110, in place of reactive current reference idc which was inputted in the prior art example of FIG. 14. At the same time, it inputs active current reference signal iqm outputted from adding circuit 110, in place of active current reference iqc which was inputted in the prior art example of FIG. 14. It then calculates inverter output voltage references VRc, VSc and VTc which determine the 3-phase output voltage of inverter main circuit 1, so that active current detected value iq and reactive current detected value id from active/reactive current detector 104 are equal to active current correction reference signal iqm and reative current correction reference signal idm.

In the embodiment in FIGS. 1a and 1b, when interconnection circuit breaker 5 is closed and inverter 10 is interconnected with AC system 6, frequency detector 107 detects the frequency of the AC voltage of AC system 6 as frequency signal F and voltage amplitude detector 108 detects the amplitude of the AC voltage of AC system 6 as voltage amplitude signal V. Therefore, frequency signal F and frequency reference signal Fc are equal and also, voltage amplitude signal V and voltage amplitude reference signal Vc are equal.

By this means, frequency correction signal EF, outputted by frequency correction computing circuit 131, and voltage amplitude correction signal EV, outputted by voltage amplitude correction computing circuit 132, become zero. Also, active current correction reference signal iqm and reactive current correction reference signal idm respectively become equal to active current reference iqc and reactive current reference idc. Therefore, inverter 10 supplies active current and reactive current to AC system 6 and load 7 according to active current reference signal iqc and reactive current reference singal idc from active/reactive current reference generator 101.

On the other hand, when interconnection circuit breaker 5 is open and inverter 10 alone supplies power to load 7, frequency signal F detected by frequency detector 107 differs from the frequency of the AC voltage of AC system 6. Also, voltage amplitude signal V detected by voltage amplitude detector 108 differs from the amplitude of the AC voltage of AC system 6. Therefore, there is then a difference between frequency signal F and frequency reference signal Fc. Also, there is then a difference between voltage amplitude signal V and voltage amplitude reference signal Vc.

For this reason, frequency correction signal EF outputted from frequency correction computing circuit 131 and voltage amplitude correction signal EV outputted from voltage amplitude correction computing circuit 132 will not become zero.

Adding circuit 110 respectively corrects reactive current reference idc and active current reference iqc by frequency correction signal EF and voltage amplitude correction singal EV, and outputs reactive current correction reference signal idm and active current correction reference signal iqm to current control circuit 105.

Inverter 10 supplies active current and reactive current to load 7 in response to active current reference signal iqm and reactive current reference signal idm from adding circuit 110. By this means, the frequency and amplitude of the inverter output voltage are made equal to frequency reference Fc and voltage amplitude reference Vc.

In this embodiment, the same control circuit can be used both when interconnection circuit breaker 5 is closed and inverter 10 and AC system 6 are interconnected and when interconnection circuit breaker 5 is open and inverter 10 alone supplies power to load 7. Also, the oscillation which occurs when inverter 10 switches from interconnected operation to sole operation or, conversely switches from sole operation to interconnected operation can be reduced.

Figure 4:
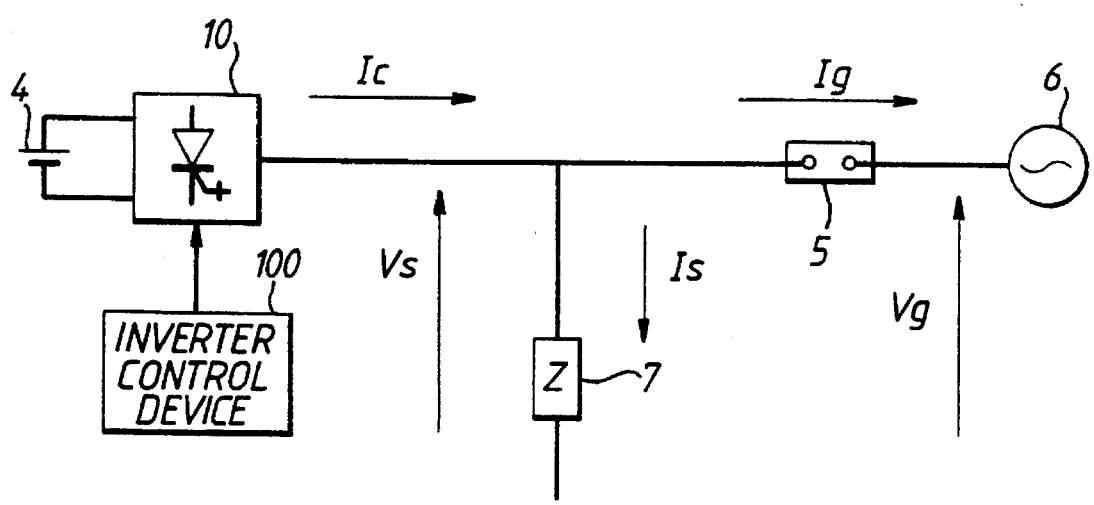
FIG. 4 is a diagram to illustrate the operation of the main circuit variables when the inverter 10 in FIGS. 1a and 1b switches from interconnected operation to sole operation.
Figure 5:
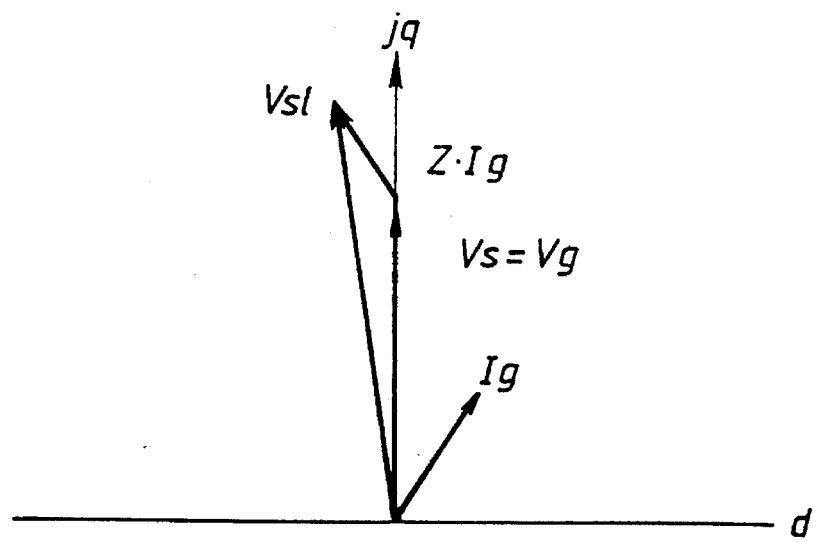
FIG. 5 is a vector diagram to illustrate the load voltage alteration at the time the inverter 10 in FIGS. 1a and 1b switches from interconnected operation to sole operation.

The following is a detailed description of the operation of this embodiment with reference to FIGS. 4 and 5. FIG. 4 expresses the embodiment of FIGS. 1a and 1b as a single line diagram, and is a diagram illustrating the operation of the main circuit variables when inverter 10 has switched from interconnected operation to sole operation. FIG. 5 is a vector diagram illustrating the fluctuation of the load voltage at the time when inverter 10 switches from interconnected operation to sole operation.

In FIG. 4, the inverter output current outputted by inverter 10 is shown as Ic, the load current flowing in load 7 as Is, and the system current flowing in AC system 6 via interconnection circuit breaker 5 as Ig. The load voltage generated by load 7 is shown as Vs and the system voltage of AC system 6 as Vg. Also, the load impedance is shown as Z. To simplify the explanation, AC system 6 is taken as an infinite bus-line. Inverter 10 is outputting inverter output current Ic equal to the current reference of inverter control device 100.

First, consider the state when interconnection circuit breaker 5 is closed and inverter 10 is executing system interconnection operation. System voltage Vg of AC system 6 maintains the rated voltage amplitude and the rated frequency, regardless of the size of the current received from or supplied to inverter 10. Since inverter 10 and load 7 are connected to AC system 6 via interconnection circuit breaker 5, load voltage Vs has the same rated voltage amplitude and rated frequency as system voltage Vg.

The following Equation (1) can be established for load voltage Vs and system voltage Vg.

$$Vs = Vg \quad (1)$$

Also, the following Equation (2) can be established for inverter output current Ic, load current Is and system current Ig.

$$Ic = Is + Ig \quad (2)$$

Furthermore, the following Equation (3) can be established for load voltage Vs and load current Is.

$$Vs = z \cdot Is \quad (3)$$

Next, when interconnection circuit breaker 5 opens and inverter 10 operates alone, as long as the current reference value is not altered by inverter control device 100, current Ig which has been flowing in AC system 6 during interconnected operation will flow in load 7. If the load voltage at this time is taken as Vs1, the following Equation (4) is established.

$$Vs1 = Z \cdot Ic = Z \cdot (Is + Ig) = Vg + Z \cdot Ig \quad (4)$$

That is to say, the voltage Z·Ig is added to rated voltage Vg of AC system 6 at load 7. FIG. 5 illustrates this state by vectors.

In FIG. 5, vectors are drawn on orthogonal coordinates d - q, and system voltage Vg is taken as on the q axis. During interconnected operation, system voltage Vg and load voltage Vs are equal and on the q axis. However, when sole operation takes place, current Ig which has been flowing in AC system 6 during interconnected operation flows in load 7. Therefore, load voltage Vs alters to Vs1 in response to impedance Z of load 7. Then, inverter 10 attempts to flow current Ic according to the current reference value, while load voltage is Vs1. Therefore, the load voltage further alters. This shows that, when inverter 10 switches from interconnected operation to sole operation, the amplitude and frequency of the load voltage alter, as long as the current reference value is not altered by inverter control device 100. That is to say, out of the voltage components which alter due to system current Ig which has been flowing in AC system 6 during interconnected operation and inverter impedance Z, the d axis component alters the frequency and the q axis component alters the amplitude.

From the above, inverter 10 corrects the active current reference value Iqc of current value Ic by the deviation between the AC system voltage rated amplitude and the AC voltage amplitude, and also corrects the reactive current reference value idc by the deviation between the AC system voltage rated frequency and the AC voltage frequency, at the point when it shifts from interconnected operation to sole operation. By this means, inverter 10 can control the output voltage so that it becomes equal to the rated amplitude and the rated frequency of the AC system voltage.

The composition of the embodiment in FIG. 1b achieves adding circuit 110, frequency correction computing circuit 131 and voltage amplitude correction computing circuit 132 by electronic circuits. However, these may also be achieved by software using microcomputers, etc. In this case, if current control circuit 105 and active/reactive current detector 104 are achieved by microcomputer software in the prior art example of FIG. 14, this embodiment has the advantage of being able to be readily incorporated into the prior art control device by adding the functions of adding circuit 110, frequency correction computing circuit 131 and voltage amplitude correction computing circuit 132 as software.

Figure 6A:
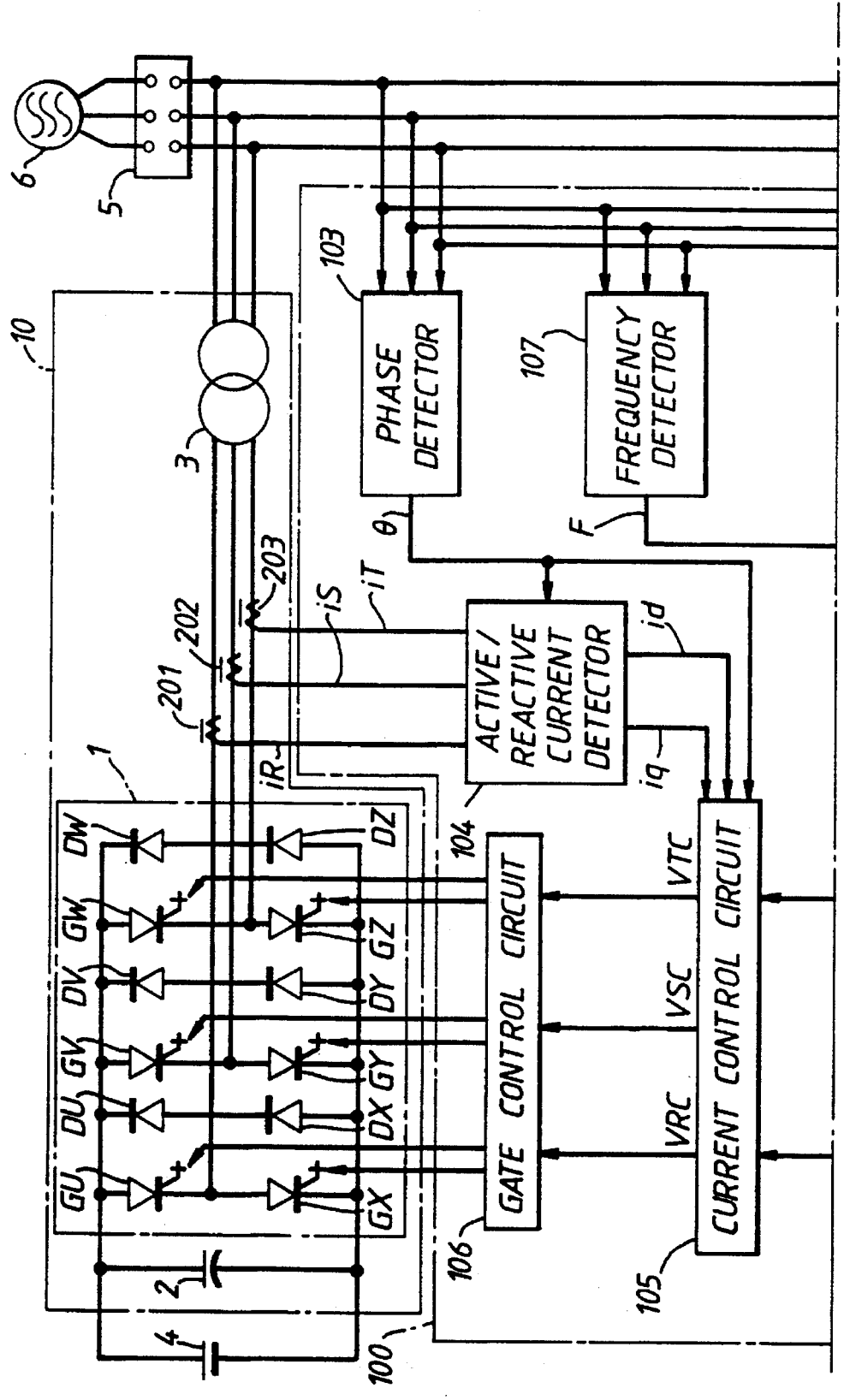
FIGS. 6a and 6b are block diagrams showing the composition of a second embodiment of a system interconnection inverter control device of this invention.
Figure 6B:
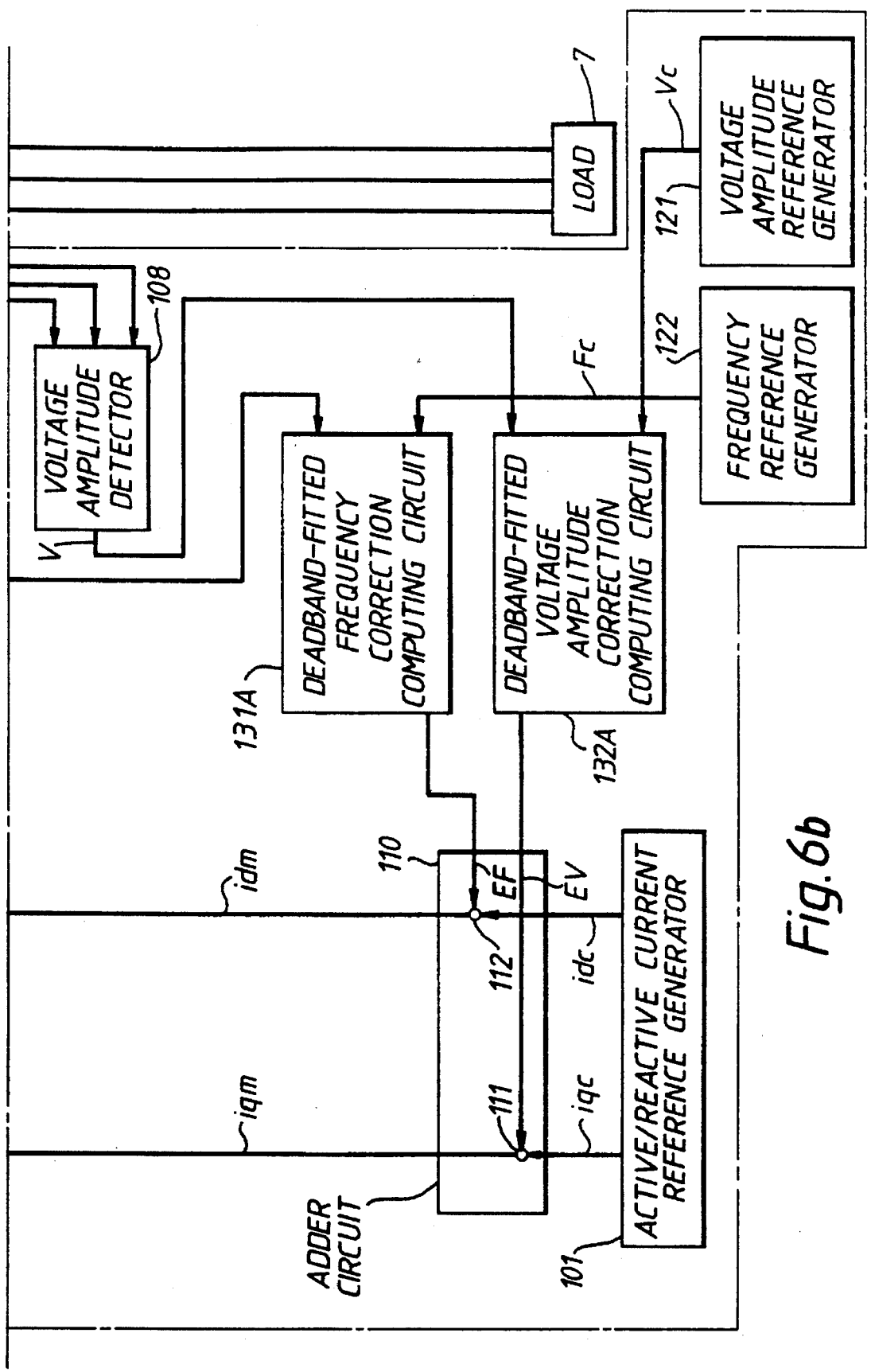

The following is a description of a second embodiment of this invention with reference to the drawings. FIGS. 6a and 6b are block diagrams showing the composition of the second embodiment of this invention. Points which differ from the first embodiment of FIGS. 1a and 1b are the following:

a deadband-fitted frequency correction computing circuit 131A, provided in place of frequency correction computing circuit 131, which composes the frequency correction computing circuit means;
and
a deadband-fitted voltage amplitude correction computing circuit 132A provided in place of voltage amplitude correction computing circuit 132, which composes the voltage amplitude correction computing circuit means.

Points other than these are the same as in FIG. 1.

Deadband-fitted frequency correction computing circuit 131A inputs frequency reference signal Fc from frequency reference generator 122 and frequency signal F from frequency detector 107. After taking the difference by an adder 1311A in FIG. 7, it outputs frequency correction signal EF via a deadband generating circuit 1313A and a proportional integration computing circuit 1312A as described later.

Deadband-fitted voltage amplitude correction computing circuit 132A inputs voltage amplitude reference signal Vc from voltage amplitude reference generator 121 and voltage amplitude signal V from voltage amplitude detector 108. After taking the difference by an adder 1321A in FIG. 8, it outputs voltage amplitude correction signal EV via a deadband generating circuit 1323A and a proportional integration computing circuit 1322A.

Adding circuit 110 has adders 111 and 112. Adder 111 subtracts voltage amplitude correction signal EV outputted from deadband-fitted voltage amplitude correction computing circuit 132A from active current reference iqc outputted from active/reactive current reference generator 101, and outputs active current correction reference signal iqm to current control circuit 105. Also, adder 112 subtracts frequency correction signal EF outputted from deadband-fitted frequency correction computing circuit 131A from reactive current reference idc outputted from active/reactive current reference generator 101, and outputs reactive current correction reference signal idm to current control circuit 105.

Figure 7:
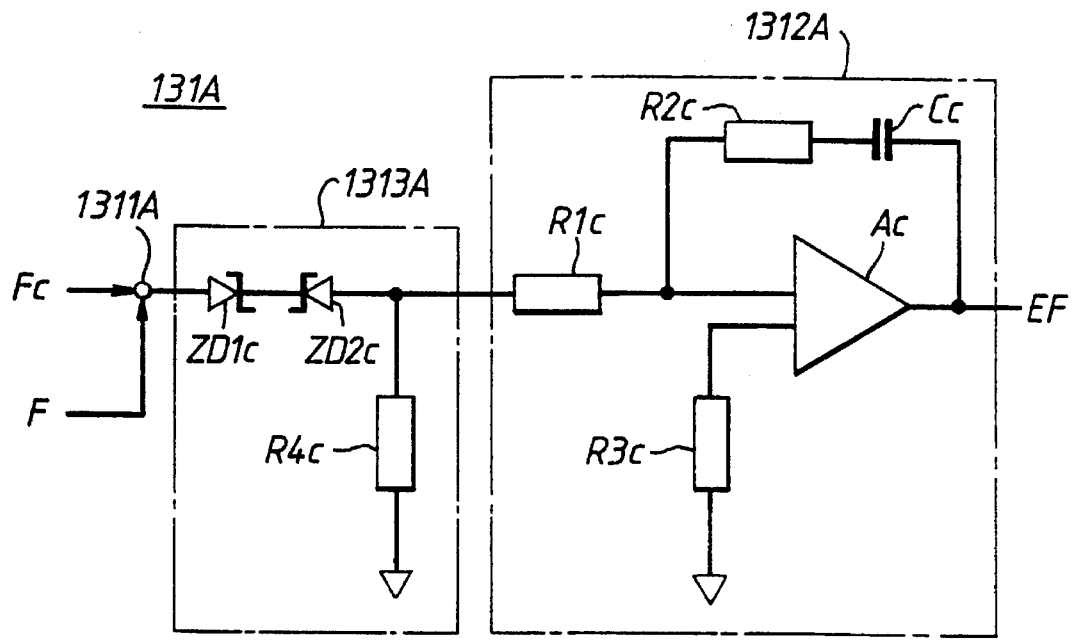
FIG. 7 is a diagram showing an example of a practical circuit for a deadband-fitted frequency correction computing circuit 131A in FIG. 6.

FIG. 7 shows a practical circuit example for deadband-fitted frequency correction computing circuit 131A in FIG. 6b. This is composed of an adder 1311A, a deadband generating circuit 1313A and a proportional integration computing circuit 1312A. Proportional integration computing circuit 1312A is composed of an operational amplifier Ac, resistors R1c, R2c and R3c and a capacitor Cc. Deadband generating circuit 1313A is composed of Zener diodes ZD1c, ZD2c and a resistor R4c, and receives the difference outputted from adder 1311A and applies the difference to proportional integration computing circuit 1312A only when the difference exceeds a first specified value, for example 0.5 Hz.

Figure 8:
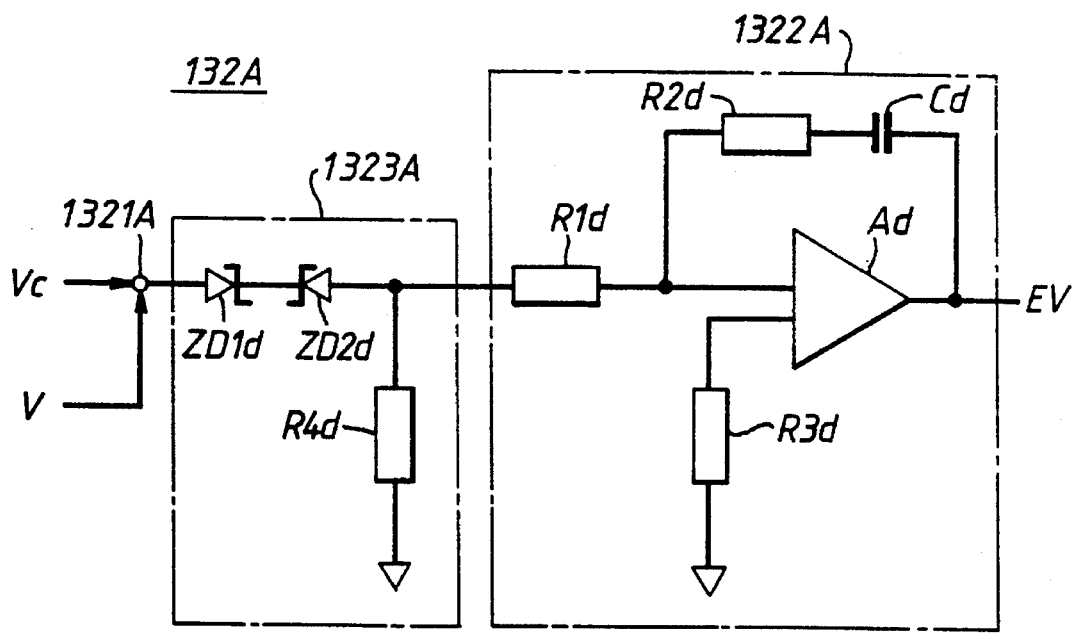
FIG. 8 is a diagram showing an example of a practical circuit for a deadband-fitted voltage amplitude correction computing circuit 132A in FIG. 6.

FIG. 8 shows a practical circuit example for deadband-fitted voltage amplitude correction computing circuit 132A in FIG. 6b. This is composed of an adder 1321A, a proportional integration computing circuit 1322A and a deadband generating circuit 1323A. Proportional integration computing circuit 1322A is composed of an operational amplifier Ad, resistors R1d, R2d and R3d and a capacitor Cd. Deadband generating circuit 1323A is composed of Zener diodes ZD1d, ZD2d and a resistor R4d, and receives the difference outputted from adder 1321A and applies the difference to proportional integration computing circuit 1322A only when the difference exceeds a second specified value, for example 5% of voltage Vc.

When using this type of composition, it is possible to continue to supply power to load 7 by inverter 10 alone, even if interconnection with AC system 6 is interrupted, by causing current control circuit 105 to output inverter output voltage reference singals VRc, VSc and VTc by controlling such that active current signal iq equals active current correction reference signal iqm and, at the same time, reactive current signal id equals reactive current correction reference signal idm.

The following is a description of the operation of the second embodiment of this invention. Only the portion of the operation different from that of the embodiment of FIG. 1 will be described.

In FIG. 6b, deadband-fitted frequency correction computing circuit 131A inputs frequency reference signal Fc from frequency reference generator 122 and frequency signal F from frequency detector 107. After taking the difference by adder 1311A in FIG. 7, it outputs frequency correction signal EF via deadband generating circuit 1313A and proportional integration computing circuit 1312A.

Deadband-fitted voltage amplitude correction computing circuit 132A inputs voltage reference signal Vc from voltage amplitude reference generator 121 and voltage amplitude signal V from voltage amplitude detector 108. After taking the difference by adder 1321A in FIG. 8, it outputs voltage amplitude correction signal EV via deadband generating circuit 1323A and proportional integration computing circuit 1322A.

Adding circuit 110 subtracts frequency correction signal EF outputted from deadband-fitted frequency correction computing circuit 131A from reactive current reference idc outputted from active/reactive current reference generator 101 using adder 112, and outputs reactive current correction reference signal idm. At the same time, it subtracts voltage amplitude correction signal EV outputted from deadband-fitted voltage amplitude correction computing circuit 132A from active current reference iqc outputted from active/reactive current reference generator 101 using adder 111, and outputs active current correction reference signal iqm.

Current control circuit 105 inputs reactive current reference signal idm outputted from adding circuit 110, and active current reference signal iqm outputted from adding circuit 110. It then calculates inverter output voltage references VRc, VSc and VTc which determine the 3-phase output voltage of inverter main circuit 1, so that active current detected value iq and reactive current detected value id from active/reactive current detector 104 are equal to active current correction reference signal iqm and reactive current correction reference signal idm.

In the embodiment in FIGS. 6a and 6b, when interconnection circuit breaker 5 is closed and inverter 10 is interconnected with AC system 6, frequency detector 107 detects the AC voltage frequency of AC system 6 as frequency signal F and voltage amplitude detector 108 detects the AC voltage amplitude of AC system 6 as voltage amplitude signal V. Therefore, frequency signal F and frequency reference signal Fc are equal and also, voltage amplitude signal V and voltage amplitude reference signal Vc are equal.

By this means, frequency correction signal EF outputted by deadband-fitted frequency correction computing circuit 131A and voltage amplitude correction signal EV outputted by deadband-fitted voltage amplitude correction computing circuit 132A become zero. Also, active current correction reference signal iqm and reactive current correction reference signal idm respectively become equal to active current reference iqc and reactive current reference idc. Therefore, inverter 10 supplies active current and reactive current to AC system 6 and load 7 according to active current reference signal iqc and reactive current reference signal idc from active/reactive current reference generator 101.

The generation of frequency correction signal EF and voltage amplitude correction signal EV due to fluctuations in the system conditions during interconnected operation are suppressed by causing the deviation between frequency signal F and frequency reference signal Fc and the deviation between voltage amplitude signal V and voltage reference signal Vc to be within the deadbands of deadband generating circuits 1313A and 1323A.

On the other hand, when interconnection circuit breaker 5 is open and inverter 10 alone supplies power to load 7, frequency signal F detected by frequency detector 107 differs from the frequency of the AC voltage of AC system 6. Also, voltage amplitude signal V detected by voltage amplitude detector 108 differs from the amplitude of the AC voltage of AC system 6. Therefore, there will be a deviation between frequency signal F and frequency reference signal Fc which exceeds the first specified value corresponding to a first deadband. Also, there will be a deviation between voltage amplitude signal V and voltage amplitude reference signal Vc which exceeds the second specified value corresponding to a second deadband.

For this reason, frequency correction signal EF outputted from deadband-fitted frequency correction computing circuit 131A and voltage amplitude correction signal EV outputted from deadband-fitted voltage amplitude correction computing circuit 132A will not become zero.

Adding circuit 110 respectively corrects reactive current reference idc and active current reference iqc by frequency correction signal EF and voltage amplitude correction signal EV, and outputs reactive current correction reference signal idm and active current correction reference signal iqm to current control circuit 105.

Inverter 10 supplies active current and reactive current to load 7 in response to active current reference signal iqm and reactive current reference signal idm from adding circuit 110. By this means, the frequency and amplitude of the inverter output voltage can be controlled in the vicinity of frequency reference signal Fc and voltage amplitude reference Vc, respectively.

In this embodiment, the same control circuit can be used both when interconnection circuit breaker 5 is closed and inverter 10 and AC system 6 are interconnected and when interconnection circuit breaker 5 is open and inverter 10 alone supplies power to load 7. Also, the disturbance which occurs when inverter 10 switches from interconnected operation to sole operation or, conversely switches from sole operation to interconnected operation can be reduced.

Based on the above-description, it is easy for those skilled in the art to construct practical deadband generating circuits 1313A and 1323A and proportional integration computing circuits 1312A and 1322A. Accordingly, the detailed description of the values or constructions of the circuit elements or devices in circuits 1313A, 1323A, 1312A and 1322A may be omitted.

In the embodiment in FIGS. 6a and 6b, the capability of suppressing unnecessary control operations which occur due to system fluctuations during interconnected operation is added to the basic operation of the embodiment in FIG. 1 by the use of deadband-fitted frequency correction computing circuit 131A and deadband-fitted voltage amplitude correction computing circuit 132A.

Next, a third embodiment of this invention is described with reference to FIGS. 9–13.

Figure 9A:
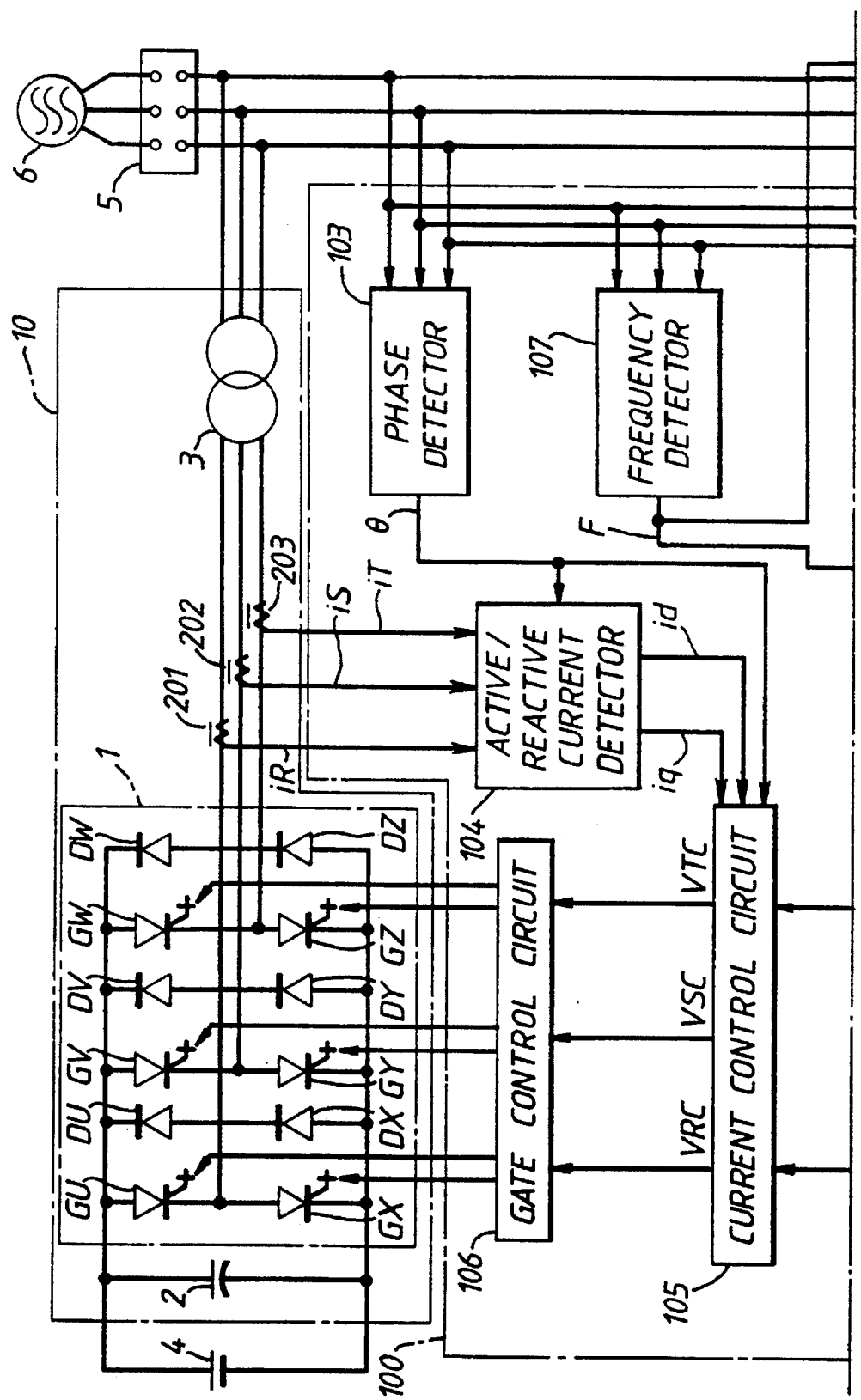
FIG. 9a and 9b are showing the composition of a third embodiment of a system interconnection inverter control device of this invention.
Figure 9B:
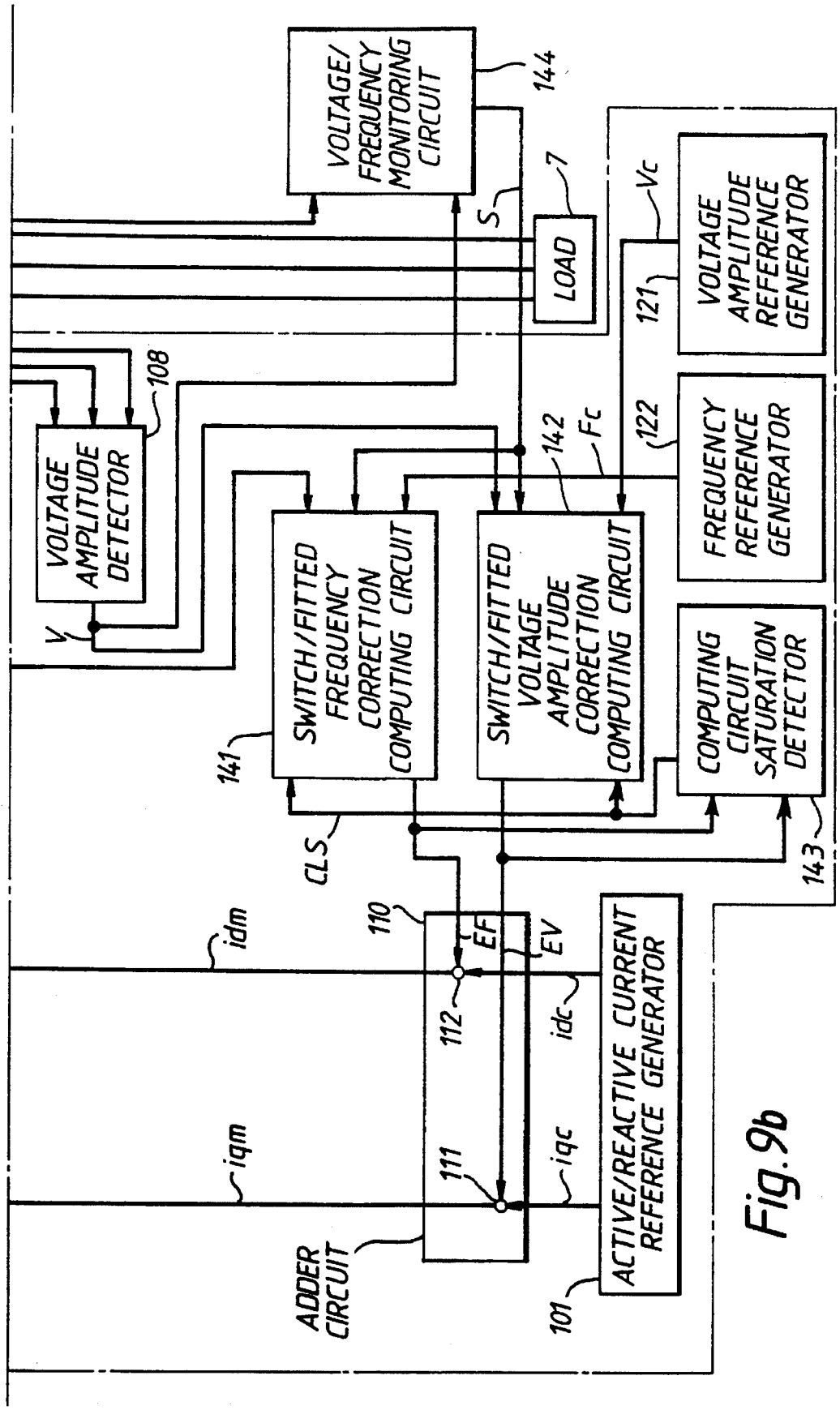

FIGS. 9a and 9b are block diagrams showing the schematic composition. Here, parts which are the same as in FIG. 1 have been given the same symbols and their descriptions have been omitted. Points which differ from FIG. 1 are the provision of:

a switch-fitted frequency correction computing circuit 141 and a switch-fitted voltage amplitude correction computing circuit 142 in place of:

frequency correction computing circuit 131 and voltage amplitude correction computing circuit 132, and the new addition of:

a computing circuit saturation detector 143 and a voltage/frequency monitoring circuit 144.

Figure 10:
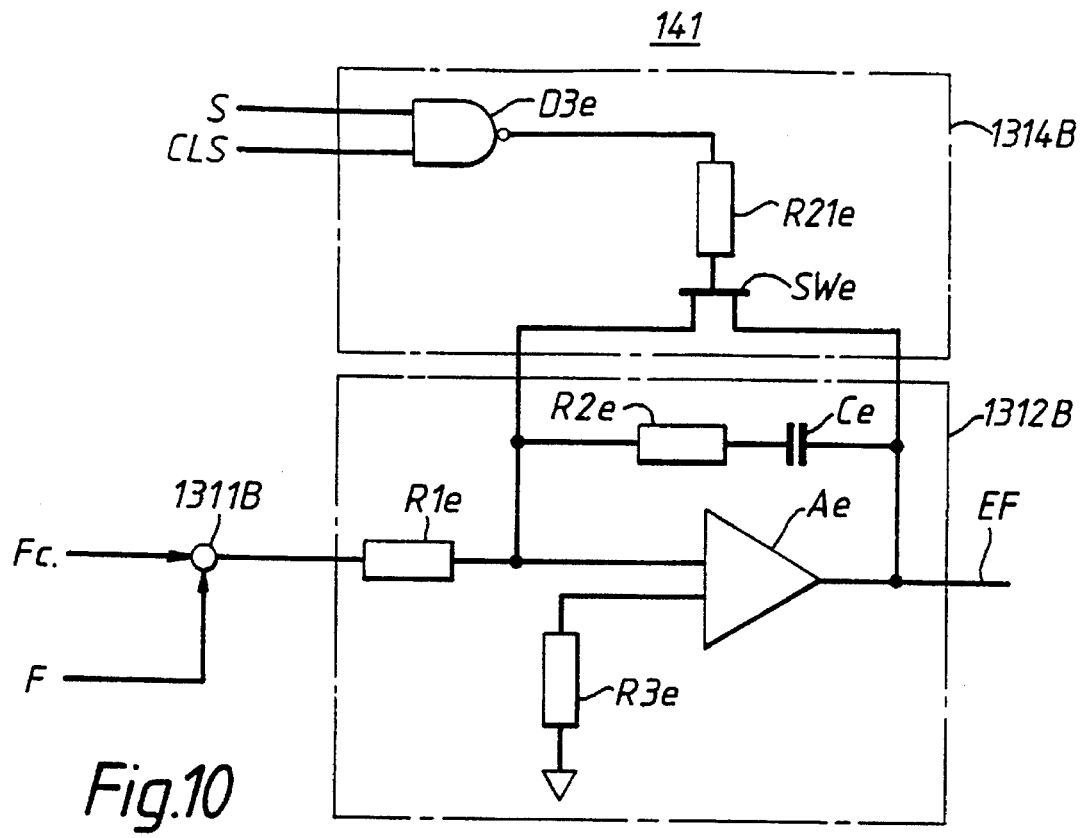
FIG. 10 is a diagram showing an example of a practical circuit for a switch-fitted frequency correction computing circuit 141 in FIGS. 9a and 9b.

FIG. 10 shows a practical circuit example for switch-fitted frequency correction computing circuit 141. Circuit 141 is composed of an adder 1311B, a switch circuit 1314B which is composed of a field effect transistor SWe, a resistor R21e and a NAND circuit D3e, and a proportional integration circuit 1312B which is composed of resistors R1e, R2e and R3e, a capacitor Ce and an operational amplifier Ae.

Figure 11:
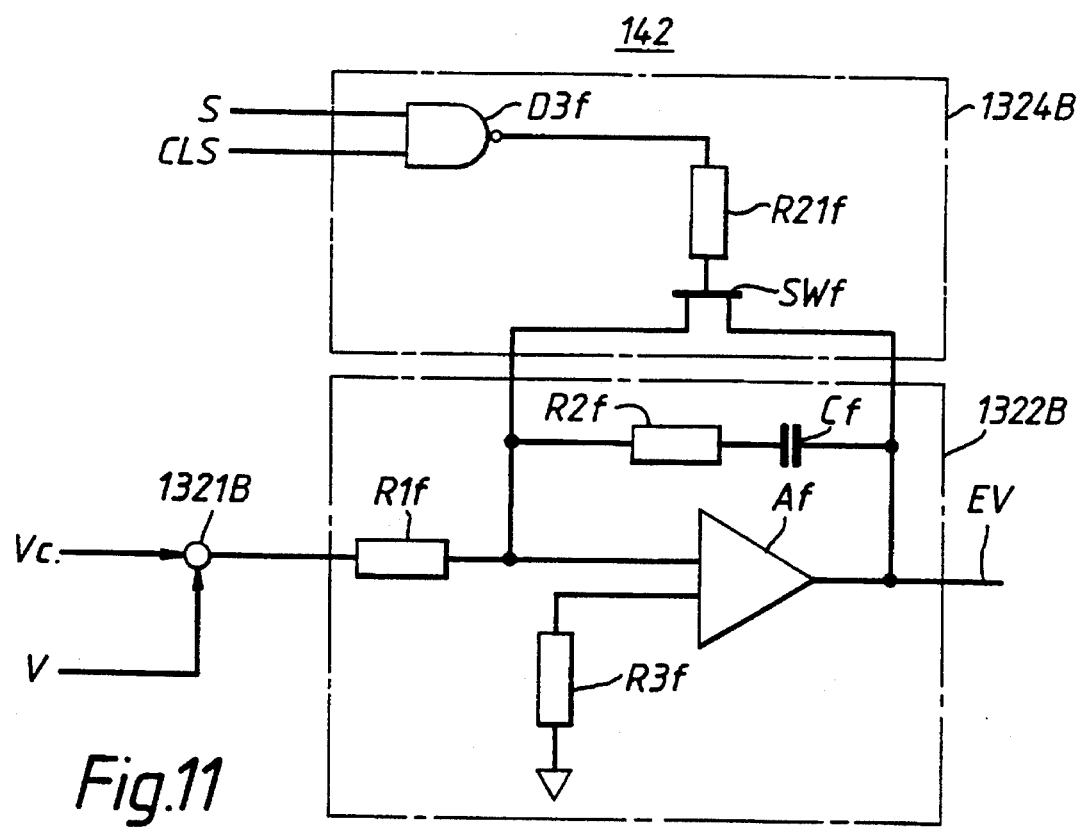
FIG. 11 is a diagram showing an example of a practical circuit for a switch-fitted voltage amplitude correction computing circuit 142 in FIGS. 9a & 9b.

FIG. 11 shows a practical circuit example for switch-fitted voltage amplitude correction computing circuit 142. Circuit 142 is composed of an adder 1321B, a switch circuit 1324B which is composed of a field effect transistor SWf, a resistor R21f and a NAND circuit D3f, and a proportional integration circuit 1322B which is composed of resistors R1f, R2f and R3f, a capacitor Cf and an operational amplifier Af.

Figure 12:
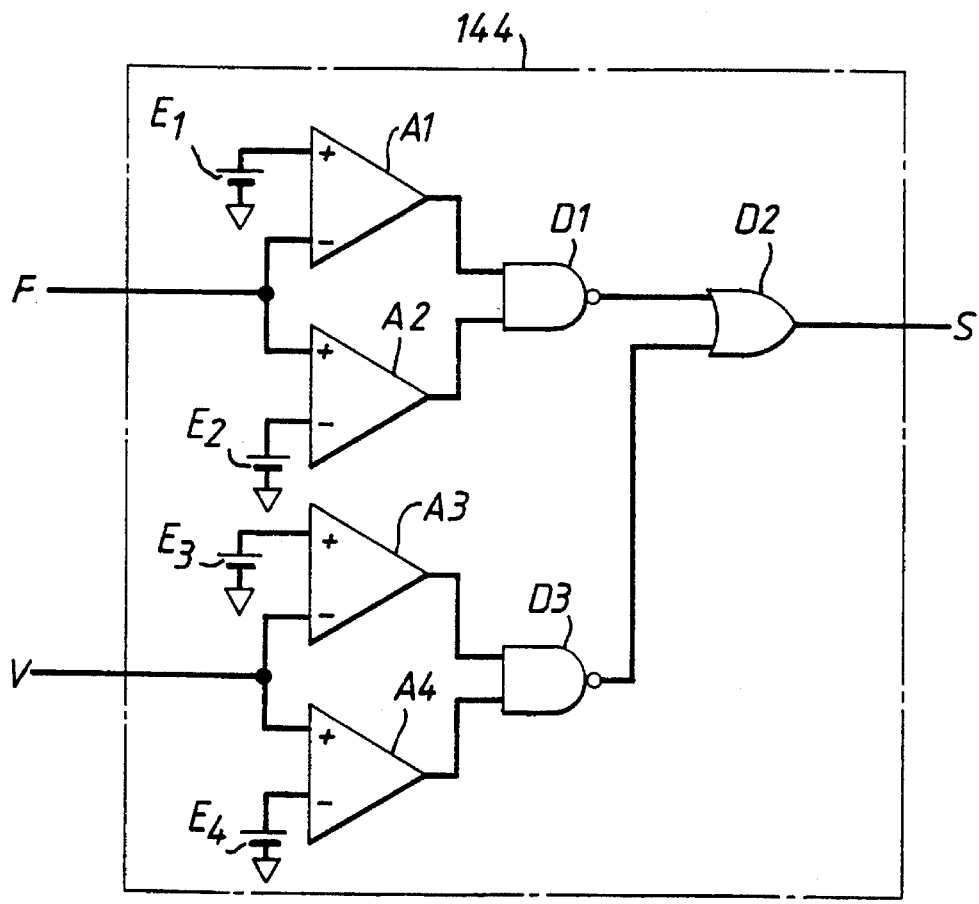
FIG. 12 is a diagram showing an example of a practical circuit for a voltage/frequency monitoring circuit 144 in FIGS. 9a and 9b.

FIG. 12 shows a practical circuit example of voltage/frequency monitoring circuit 144. Circuit 144 is composed of reference voltage sources E1, E2, E3 and E4, operational amplifiers A1, A2, A3 and A4, NAND circuits D1 and D3 and an OR circuit D2.

Figure 13:
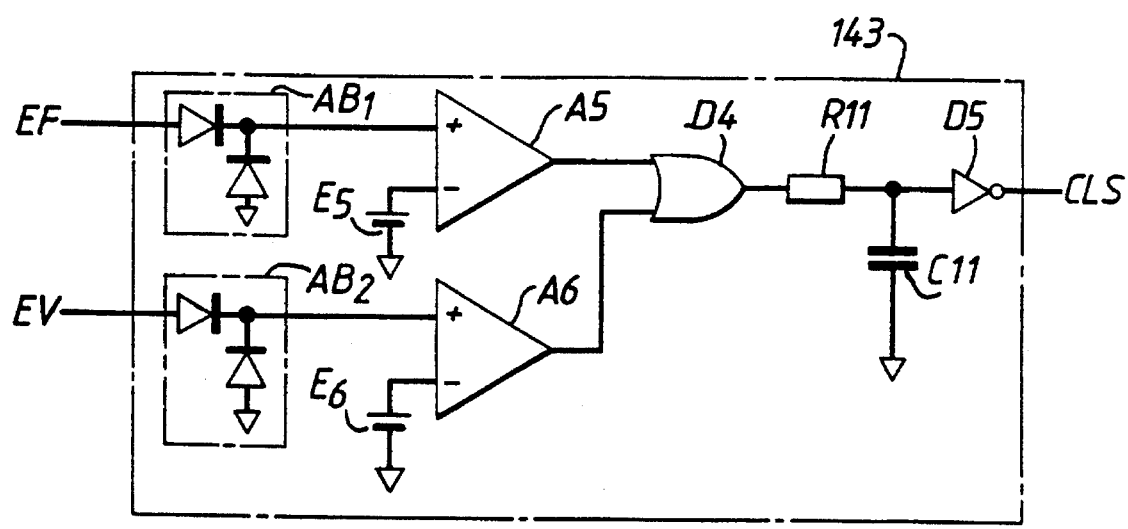
FIG. 13 is a diagram showing an example of a practical circuit for a computing circuit saturation detector 143 in FIGS. 9a and 9b.

FIG. 13 shows a practical circuit example for computing circuit saturation detector 143. This is composed of absolute value circuits AB1 and AB2, reference voltage sources E5 and E6, operational amplifiers A5 and A6, an OR circuit D4, a resistor R11, a capacitor C11 and an inverse logic circuit D5.

In FIG. 9b, voltage/frequency monitoring circuit 144 monitors the various output quantities of frequency detector 107 and voltage amplitude detector 108. When these exceed or fall below the set upper and lower limit values, it outputs a switching-OFF signal S to switch OFF the switches in switch-fitted frequency correction computing circuit 141 and switch-fitted voltage amplitude correction computing circuit 142.

Also, when the absolute value of the output of switch-fitted frequency correction computing circuit 141 or of switch-fitted voltage amplitude correction computing circuit 142 exceeds the set value for more than a specified period, computing circuit saturation detector 143 executes the operation of switching ON the relevant switch by outputting a switching-OFF cancellation signal CLS.

In the third embodiment described above, voltage/frequency monitoring circuit 144 regards as transferring to sole operation the time when the fluctuations of the voltage amplitude and the frequency exceed the specified bands. Also, by operating switch-fitted frequency correction computing circuit 141 and switch-fitted voltage amplitude correction computing circuit 142, inverter control device 100 executes the operation of commencing the above-described correction control. Therefore, the operation of this correction control is suppressed during system fluctuations when the fluctuations of the voltage amplitude and the frequency do not exceed the specified bands. And also control with excellent accuracy without deadbands can be executed when transferring to sole operation.

Moreover, when transferring from sole operation to interconnected operation, the levels of voltage correction signal EV and frequency correction signal EF are monitored by computing circuit saturation detector 143. Therefore, the operation of stopping correction control when the output continuously exceeds a specified level can be executed.

The following is a description of the operation of the third embodiment. In FIGS. 9a and 9b, the alteration of the frequency or the voltage occurring when inverter 10 is disconnected from AC system 6 is detected by voltage/frequency monitoring circuit 144. In that event, the correction control is commenced by switching OFF the switches in switch-fitted frequency correction computing circuit 141 and switch-fitted voltage amplitude correction computing circuit 142.

The switching-OFF operation is executed when switching-OFF signal S becomes logic 1 and a switching-OFF cancellation signal CLS is logic 1. In FIG. 12, switching-OFF signal S becomes logic 1 when frequency signal F is greater than the value of reference voltage source E1 which indicates the upper limit value for frequency signal F or is smaller than the value of reference voltage source E2 which indicates the lower limit value for frequency singal F;

or when voltage amplitude signal V is greater than the value of reference voltage source E3 which indicates the upper limit value for voltage amplitude signal V or is smaller than the value of reference voltage source E4 which indicates the lower limit value for voltage amplitude signal V. At this time, NAND circuits D3e and D3f in FIGS. 10 and 11 output logic 0 and field effect transistors SWe and SWf become non-conductive.

Consider the case where frequency signal F and voltage amplitude signal V are input to voltage/frequency monitoring circuit 144 as a voltage signal of 5.00 V, the values of reference voltage sources El, E2, E3 and E4 are determined 5.05V, 4.95V, 5.05V and 4.95V, respectively.

Conversely, the case when inverter 10 has transferred form sole operation to interconnected operation is as follows. When voltage amplitude signal V and frequency signal F are respectively equal to voltage reference signal Vc outputted from voltage amplitude reference generator 121 and frequency reference signal Fc outputted from frequency reference generator 122, the values of frequency correction signal EF outputted from switch-fitted frequency correction computing circuit 141 and voltage amplitude correction singal EV outputted from switch-fitted voltage amplitude correction computing circuit 142 are zero. Therefore, operation continues unchanged. However, when a deviation occurs between frequency signal F and frequency reference signal Fc, or between voltage amplitude signal V and voltage reference signal Vc, the value of frequency correction signal EF or voltage amplitude correction signal EV increases above the maximum output level due to the influence of proportional integration circuit 1312B or 1322B. Therefore, the fact that the value of frequency correction signal EF or voltage amplitude correction signal EV exceeding the maximum output levels has continued for more than a specified period is detected by computing circuit saturation detector 143. Thus, field effect transistors SWe and SWf of switch-fitted frequency correction computing circuit 141 and switch-fitted voltage amplitude correction computing circuit 142 are switched ON, and operation transfers to the normal interconnected state.

The switching ON operation is executed when the switching-OFF cancellation signal CLS becomes logic 0. In FIG. 13, when a state where the output of absolute circuit AB1 which is the absolute value of frequency correction signal EF (for example, 8.5 V) becomes greater than the value of reference voltage source E5 (for example, 8.0 V) indicating a first maximum output set value of frequency correction signal EF or a state where the output of absolute value circuit AB2 which is the absolute value of voltage amplitude correction signal EV (for example, 8.5 V) becomes greater than the value of reference voltage source E6 (for example, 8.0 V) indicating a second maximum value of voltage amplitude correction signal EV continues longer than the signal delay time, for example 100 milliseconds, due to resistor R11 and capacitor C11. At this time, NAND circuits D3e and D3f in FIGS. 10 and 11 output logic 1 and field effect transistors SWe and SWf become conductive.

In the embodiment, the signal delay time is provided commonly for signals EF and EV. But according to this invention, it is possible that a first delay time and a second delay time are provided for signals EF and EV, separately.

Based on the above-description, it is easy for those skilled in the art to construct practical switch-fitted frequency correction computing circuit 141, switch-fitted voltage amplitude correction computing circuit 142, computing circuit saturation detector 143 and voltage/frequency monitoring circuit 144. Accordingly, the detailed description of the values or constructions of the circuit elements or devices in circuits 141, 142, 144 and detector 143 may be omitted.

When using this embodiment, highly accurate operation becomes possible since there is no deadband in the control system when transferring to sole operation. Also this embodiment can use the same control circuit both when interconnection circuit breaker 5 is closed and inverter 10 and AC system 6 are interconnected and when interconnection circuit breaker 5 is open and inverter 10 supplies power to load 7 by itself. The disturbance which occurs when inverter 10 switches from interconnected operation to sole operation or, conversely, from sole operation to interconnected operation can be reduced.

This invention is not limited to the embodiments described above. For example, the embodiment in FIG. 6b achieves adding circuit 110, deadband-fitted frequency correction computing circuit 131A and deadband-fitted voltage amplitude correction computing circuit 132A by electronic circuits. However, these may also be achieved by software using microcomputers, etc. In this case, if current control circuit 105 and active/reactive current detector 104 are achieved by microcomputer software in the prior art example of FIG. 14, this invention has the advantage of being able to be readily incorporated into the control device by adding the functions of adding circuit 110, deadband-fitted frequency correction computing circuit 131A and deadband-fitted voltage amplitude correction computing circuit 132A as software.

Also, in FIG. 9b, switch-fitted frequency correction computing circuit 141, switch-fitted voltage amplitude correction computing circuit 142, voltage/frequency monitoring circuit 144 and computing circuit saturation detector 143 can be achieved by software.

When using this invention, appropriate power can be supplied to a load from a system using a system interconnection inverter, whether the interconnection state of the system interconnection inverter and the AC system alters from the interconnected state to the sole state or, conversely, alters from the sole state to the interconnected state, without incorporating this state alteration as an interconnection circuit breaker state signal or the like and without temporarily stopping the operation of the system interconnection inverter. Therefore, a system interconnection inverter control device can be provided which increases the reliability of the system which uses a system interconnection inverter, and which can expand the range of its application.

Obviously, numerous modification and variations of the present invention are possible in light of the above teachings. It is therefore to be understood that within the scope of the appended claims, the invention may be practiced otherwise than as specifically described herein.

What is claim is:

1. A control device for an inverter which is connected to an AC system via an interconnection circuit breaker, is connected to a load, converts DC power from a DC power source to AC power, and supplies or receives said AC power to or from said AC system, said load receiving said AC power, said control device comprising:

active-reactive current reference generator means for generating an active current reference signal and a reactive current reference signal;

active/reactive current detector means for detecting an active current component and a reactive current component of an output AC current of said inverter to output as an active current signal and a reactive current signal, respectively;

phase detector means for detecting a phase of an AC voltage of said AC power to output a phase signal;

frequency detector means for detecting a frequency of sand AC voltage to output a frequency signal;

voltage amplitude detector means for detecting an amplitude of said AC voltage to output a voltage amplitude signal;

frequency reference generator means for generating a frequency reference signal;

voltage amplitude reference generator means for generating a voltage amplitude reference signal;

frequency correction computing circuit means for detecting a frequency deviation between said frequency reference signal and said frequency signal and for generating a frequency correction signal based on said frequency deviation;

voltage amplitude correction computing circuit means for detecting a voltage amplitude deviation between said voltage amplitude reference signal and said voltage amplitude signal and for generating a voltage amplitude correction signal based on said voltage amplitude deviation;

adder means for adding said active current reference signal and said voltage amplitude correction signal to output as an active current correction reference signal, and for adding said reactive current reference signal and said frequency correction signal to output as a reactive current correction signal;

current control circuit means connected to receive said phase signal, said active current signal, said reactive current signal, said active current correction reference signal, and said reactive current correction reference signal for generating an output voltage reference signal for said inverter such that said active current signal equals said active current correction reference signal and said reactive current signal equals said reactive current correction reference signal; and gate control circuit means for controlling said output voltage of said inverter based on said output voltage reference signal, whereby said inverter continues to supply a required power to said load regardless of the operating condition of said interconnection circuit breaker.

2. The control device according to claim 1, wherein said frequency correction computing circuit means includes:

a first adder connected to receive said frequency reference signal and said frequency signal for detecting said frequency deviation; and a first proportional integration computing circuit connected to receive said frequency deviation for executing proportional integration for said frequency deviation to generate said frequency correction signal; and wherein said voltage amplitude correction computing circuit means includes:

a second adder connected to receive said voltage amplitude reference signal and said voltage amplitude signal for detecting said voltage amplitude deviation; and a second proportional integration computing circuit connected to receive said voltage amplitude deviation for executing proportional integration for said voltage amplitude deviation to generate said voltage amplitude correction signal.

3. The control device according to claim 1, wherein:

said frequency correction computing circuit means generates said frequency correction signal only when said frequency deviation exceeds a first specified value; and said voltage amplitude correction computing circuit means generates said voltage amplitude correction signal only when said voltage amplitude deviation exceeds a second specified value.

4. The control device according to claim 3, wherein said frequency correction computing circuit means includes:

a first adder connected to receive said frequency reference signal and said frequency signal for detecting said frequency deviation;

a first deadband generating circuit connected to receive said frequency deviation for generating said frequency deviation only when said frequency deviation exceeds said first specified value; and a first proportional integration computing circuit connected to receive said frequency deviation from said first deadband generating circuit for executing proportional integration for said frequency deviation to generate said frequency correction signal; and wherein said voltage amplitude correction computing circuit means includes:

a second adder connected to receive said voltage amplitude reference signal and said voltage amplitude signal for detecting said voltage amplitude deviation;

a second deadband generating circuit connected to receive said voltage amplitude deviation for generating said voltage amplitude deviation only when said voltage amplitude deviation exceeds said second specified value; and a second proportional integration computing circuit connected to receive said voltage amplitude deviation from said second deadband generating circuit for executing proportional integration for said voltage amplitude deviation to generate said voltage amplitude correction signal.

5. The control device according to claim 1, further comprising voltage/frequency monitoring circuit means connected to receive said frequency signal and said voltage amplitude signal for generating a switching-OFF signal when said frequency signal is outside a first specified band or said voltage amplitude signal is outside a second specified band, wherein:

said frequency correction computing circuit means generates said frequency correction signal only when said switching-OFF signal is applied; and said voltage amplitude correction computing circuit means generates said voltage amplitude correction signal only when said switching-OFF signal is applied.

6. The control device according to claim 1, further comprising computing circuit saturation detector means connected to receive said frequency correction signal and said voltage amplitude correction signal for generating a switching-OFF cancellation signal only when a state where said frequency correction signal exceeds a first maximum output level has continued for more than a first specified period or a state where said voltage correction signal exceeds a second maximum output level has continued for more than a second specified period, wherein:

said frequency correction computing circuit means stops generating said frequency correction signal when said switching-OFF cancellation signal is applied; and said voltage amplitude correction computing circuit means stops generating said voltage amplitude correction signal when said switching-OFF cancellation signal is applied.

7. The control device according to claim 1, further comprising:

voltage/frequency monitoring circuit means connected to receive said frequency signal and said voltage amplitude signal for generating a switching-OFF signal when said frequency signal is outside a first specified band or said voltage amplitude signal is outside a second specified band; and computing circuit saturation detector means connected to receive said frequency correction signal and said voltage amplitude correction signal for generating a switching-OFF cancellation signal only when a state where said frequency correction signal exceeds a first maximum output level has continued for more than a specified period or a state where said voltage correction signal exceeds a second maximum output level has continued for more than said specified period;

wherein:

said frequency correction computing circuit means generates said frequency correction signal only when said switching-OFF signal is applied and said switching-OFF cancellation signal is not applied; and said voltage amplitude correction computing circuit means generates said voltage amplitude correction signal only when said switching-OFF signal is applied and said switching-OFF cancellation signal is not applied.

8. The control device according to claim 7, wherein said frequency correction computing circuit means includes:

a first adder for detecting said frequency deviation between said frequency reference signal and said frequency signal;

a first proportional integration computing circuit for executing first proportional integration for said frequency deviation from said first adder to generate said frequency correction signal; and a first switch circuit for executing said first proportional integration in said first proportional integration computing circuit to generate said frequency correction signal only when said switching-OFF signal is applied and said switching-OFF cancellation signal is not applied; and wherein said voltage amplitude correction computing circuit means includes:

a second adder for detecting said voltage amplitude deviation between said voltage amplitude reference signal and said voltage amplitude signal;

a second proportional integration computing circuit for executing second proportional integration for said voltage amplitude deviation from said second adder to generate said voltage amplitude correction signal; and a second switch circuit for executing said second proportional integration in said second proportional integration computing circuit to generate said voltage amplitude correction signal only when said switching-OFF signal is applied and said switching-OFF cancellation signal is not applied.

9. The control device according to claim 7, wherein said voltage/frequency monitoring circuit means comprises:

a first comparator circuit connected to receive said frequency signal for generating a first switching-OFF signal when said frequency signal is greater than a first upper limit value or smaller than a first lower limit value;

a second comparator circuit connected to receive said voltage amplitude signal for generating a second switching-OFF signal when said voltage amplitude signal is greater than a second upper limit value or smaller than a second lower limit value; and an OR circuit connected to receive said first switching-OFF signal and said second switching-OFF signal at two input terminals thereof for generating said switching-OFF signal.

10. The control device according to claim 7, wherein said computing circuit saturation detector means comprises:

a first absolute value circuit for generating an absolute value of said frequency correction signal;

a first comparator for generating a first output signal when said absolute value of said frequency correction signal exceeds said first maximum output level;

a second absolute value circuit for generating an absolute value of said voltage amplitude correction signal;

a second comparator for generating a second output signal when said absolute value of said voltage amplitude correction signal exceeds said second maximum output level;

a decision circuit connected to receive said first output signal and said second output signal for generating said switching-OFF signal only when said first output signal or said second output signal has continued for more than said specified period.

11. The control device according to claim 1, wherein:

said inverter includes a voltage source type self-commutated inverter composed of a plurality of self-turn-off power conversion devices.

* * * * *